United States Patent
Ichimura

(10) Patent No.: US 9,568,617 B2
(45) Date of Patent: Feb. 14, 2017

(54) RADIATION IMAGING APPARATUS, METHOD FOR MANUFACTURING THE SAME, AND RADIATION INSPECTION APPARATUS

(71) Applicant: CANON KABUSHIKI KAISHA, Tokyo (JP)

(72) Inventor: Tomoaki Ichimura, Kitamoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/962,421

(22) Filed: Dec. 8, 2015

(65) Prior Publication Data
US 2016/0202362 A1 Jul. 14, 2016

(30) Foreign Application Priority Data

Jan. 9, 2015 (JP) ................................. 2015-003610

(51) Int. Cl.
*G01T 1/20* (2006.01)
*G01T 1/202* (2006.01)
*G01T 7/00* (2006.01)

(52) U.S. Cl.
CPC .......... *G01T 1/2023* (2013.01); *G01T 1/2018* (2013.01); *G01T 7/00* (2013.01)

(58) Field of Classification Search
CPC ......... G01T 1/2023; G01T 1/2018; G01T 7/00
USPC ....................................................... 250/366
See application file for complete search history.

(56) References Cited

U.S. PATENT DOCUMENTS

| | | | |
|---|---|---|---|
| 7,026,624 B2 | 4/2006 | Ogawa et al. | |
| 8,686,361 B2 | 4/2014 | Nomura et al. | |
| 8,779,369 B2 | 7/2014 | Ichimura et al. | |
| 8,957,383 B2 | 2/2015 | Sasaki et al. | |
| 8,975,589 B2 | 3/2015 | Ichimura et al. | |
| 9,054,012 B2 | 6/2015 | Nomura et al. | |
| 2004/0094719 A1* | 5/2004 | Ogawa .................. | G01T 1/2002 250/370.11 |
| 2013/0308755 A1 | 11/2013 | Ishida et al. | |

FOREIGN PATENT DOCUMENTS

JP 2004-103934 A 4/2004

* cited by examiner

*Primary Examiner* — David Porta
*Assistant Examiner* — Meenakshi Sahu
(74) *Attorney, Agent, or Firm* — Fitzpatrick, Cella, Harper & Scinto

(57) ABSTRACT

A radiation imaging apparatus, comprising a sensor panel on which a plurality of sensors are arrayed, a scintillator that is arranged over a base member and is made of an alkali halide, and a protective film configured to suppress deliquescence of the scintillator, wherein the protective film includes a first portion that covers a side face of the scintillator and an end of the scintillator on a side opposite to the base member, and a second portion that is smaller in a content of fluorine than the first portion and covers at least part of a surface of the first portion.

14 Claims, 6 Drawing Sheets

F I G. 3A
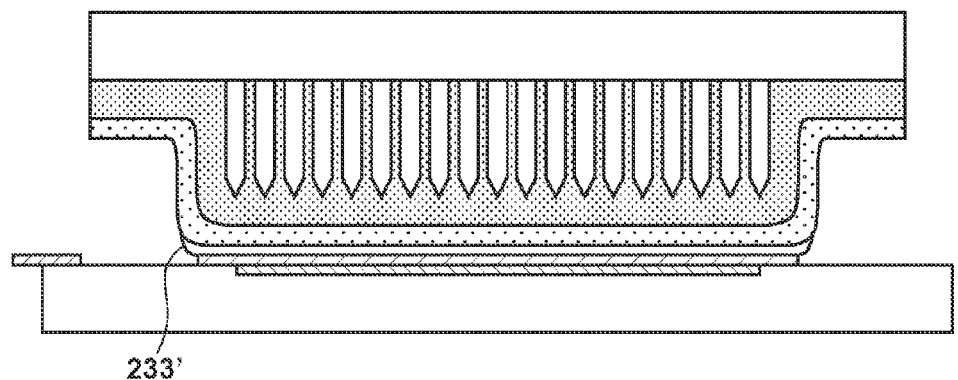
F I G. 3B
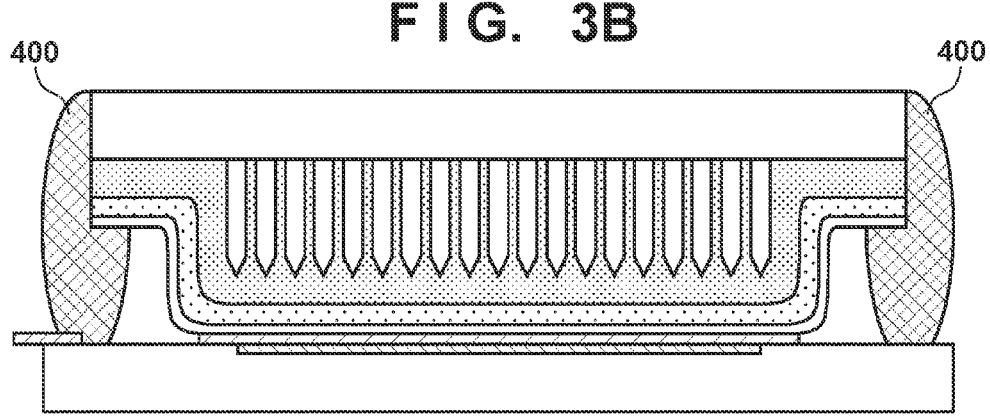

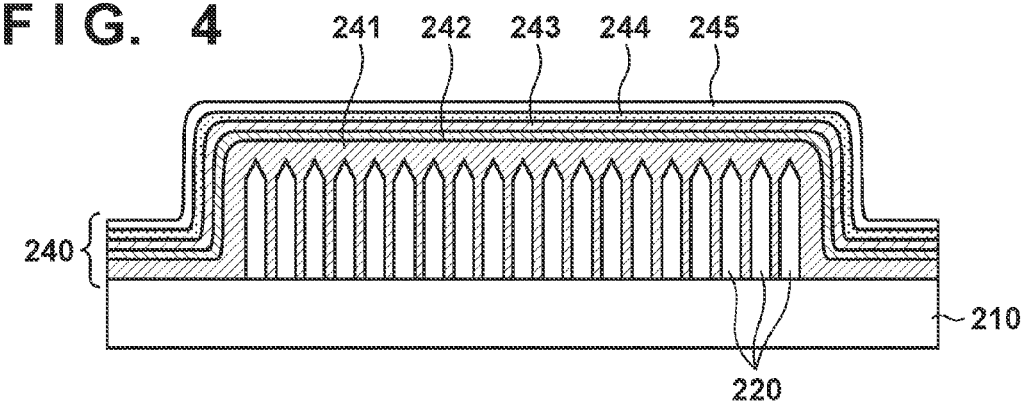
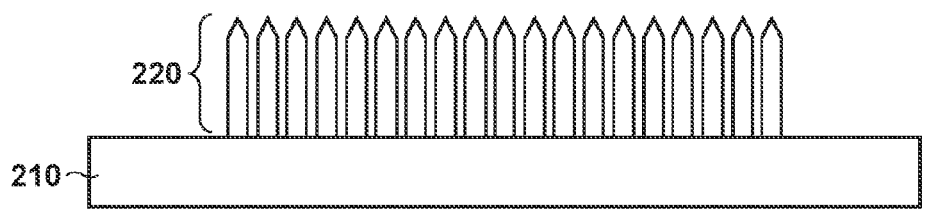
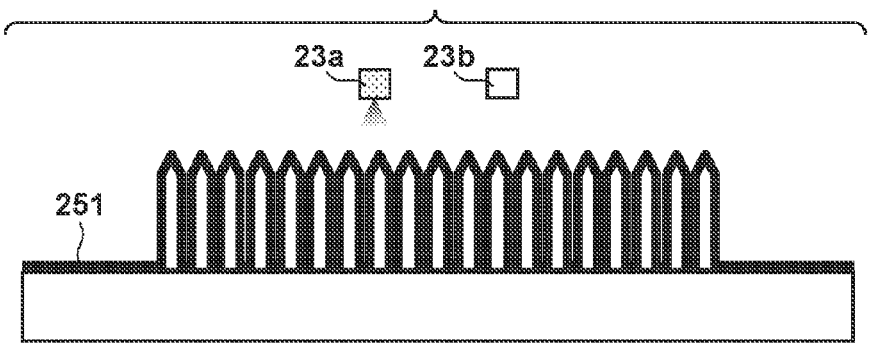
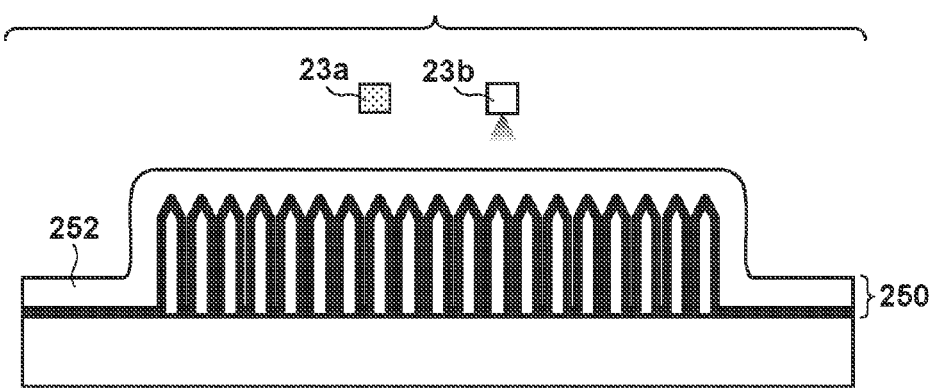

RADIATION IMAGING APPARATUS, METHOD FOR MANUFACTURING THE SAME, AND RADIATION INSPECTION APPARATUS

BACKGROUND OF THE INVENTION

Field of the Invention

The present invention relates to a radiation imaging apparatus, a method for manufacturing the same, and a radiation inspection apparatus.

Description of the Related Art

A radiation imaging apparatus includes, for example, a sensor panel in which a plurality of sensors for detecting radiation are arrayed on a substrate. In a detection method of converting radiation into light and photoelectrically converting the light into an electrical signal, the radiation imaging apparatus further includes a scintillator.

The scintillator is formed by, for example, an evaporation method, and has a structure made of a plurality of columnar crystals of thallium doped cesium iodide (Tl:CsI) or the like. Since the scintillator is deliquescent, a protective film for suppressing the deliquescence of the scintillator is formed to cover the scintillator. The scintillator is fixed to a base member such as a sensor panel, so the protective film needs to have adhesion (adhesive force).

Japanese Patent Laid-Open No. 2004-103934 exemplifies a structure in which a first protective film that covers a scintillator and contains a silane-based compound as a monomer, and a second protective film that covers the first protective film and contains a fluorine compound unsaturated hydrocarbon as a monomer are arranged.

The present inventor has found that, when a resin is used for the protective layer of a scintillator, a larger content of fluorine in the resin is more advantageous for suppressing the deliquescence of the scintillator, while a smaller content of fluorine in the resin increases the adhesion of the resin. As described above, the protective film of the scintillator needs to suppress the deliquescence of the scintillator and have adhesion. Therefore, how to use the resin with contradictory properties to form the protective film needs to be considered.

SUMMARY OF THE INVENTION

The present invention provides a new technique for improving the adhesion of the protective film of a scintillator while suppressing the deliquescence of the scintillator.

One of the aspects of the present invention provides a radiation imaging apparatus, comprising a sensor panel on which a plurality of sensors are arrayed, a scintillator that is arranged over a base member and is made of an alkali halide, and a protective film configured to suppress deliquescence of the scintillator, wherein the protective film includes a first portion that covers a side face of the scintillator and an end of the scintillator on a side opposite to the base member, and a second portion that is smaller in a content of fluorine than the first portion and covers at least part of a surface of the first portion.

Further features of the present invention will become apparent from the following description of exemplary embodiments with reference to the attached drawings.

BRIEF DESCRIPTION OF THE DRAWINGS

FIGS. 3A and 3B are views for explaining an example of the structure of a radiation imaging apparatus;

FIG. 4 is a view for explaining an example of the structure of a radiation imaging apparatus;

FIGS. 5A to 5C are views for explaining an example of a method for manufacturing a scintillator panel;

DESCRIPTION OF THE EMBODIMENTS

First Embodiment

A radiation imaging apparatus 1 (to be simply referred to as an "apparatus 1" hereinafter) according to the first embodiment will be described with reference to FIGS. 1A to 3B.

Figure 1A:
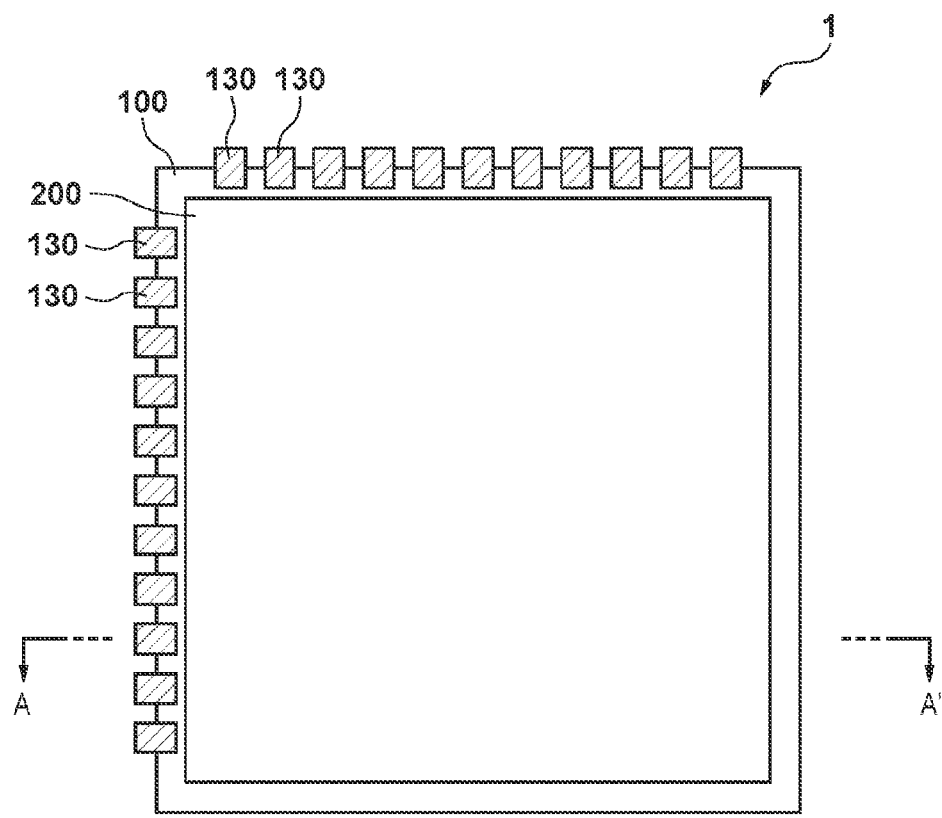
FIGS. 1A and 1B are views for explaining an example of the structure of a radiation imaging apparatus.
Figure 1B:
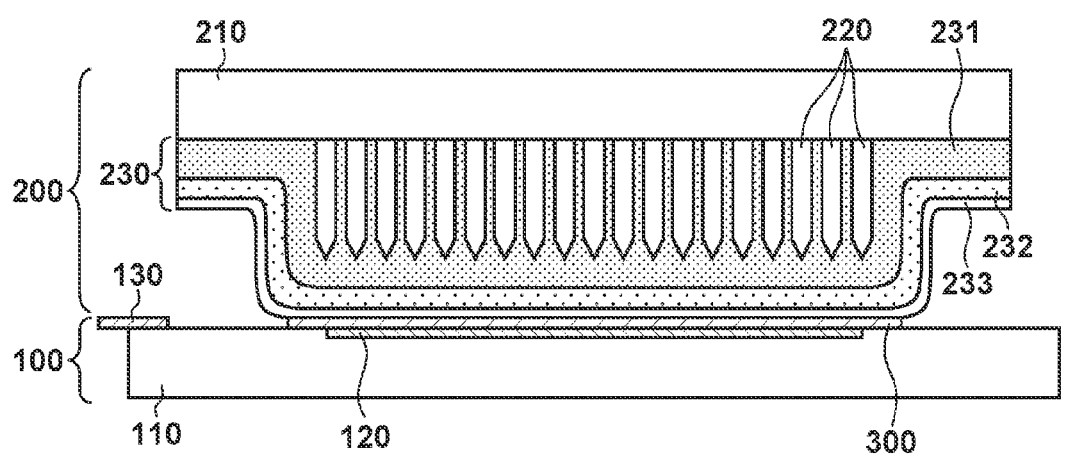

FIG. 1A is a plan view of the apparatus 1, and is a schematic view showing a structure when viewed from the top (viewed from the top with respect to an imaging surface: this applies to the entire specification). FIG. 1B shows a sectional structure taken along a cut line A-A'.

The apparatus 1 includes, for example, a sensor panel 100 and a scintillator panel 200. The sensor panel 100 includes, for example, a substrate 110, a sensor array 120 in which a plurality of sensors are arrayed on the substrate 110, and an electrode 130 for exchanging signals with the outside or receiving supply of a voltage from the outside.

As the substrate 110, for example, a glass substrate is usable. Each element constituting an imaging unit is formed from amorphous silicon or the like on the substrate 110. As each sensor, for example, a PIN sensor or a MIS sensor is usable. As a switching element for reading out a signal from each sensor, for example, a thin film transistor (TFT) is usable. Note that the structure of the sensor panel 100 is not limited to this example, and a sensor formed on a semiconductor substrate by a known semiconductor manufacturing process, such as a CMOS image sensor or a CCD image sensor, may be used.

The electrode 130 is connected to another external electrical circuit board or the like through a cable such as a flexible printed circuit board (FPC). The electrode 130 receives a control signal for controlling the sensor array 120, outputs a signal from the sensor array 120, or receives a voltage for driving the sensor array 120.

The scintillator panel 200 includes, for example, a base member 210, a scintillator 220 arranged over the base member 210, and a protective film 230 that covers the scintillator 220. The scintillator panel 200 is arranged so that the scintillator 220 is positioned on the side (lower side in FIG. 1B) of the sensor panel 100 and the base member 210 is positioned on the opposite side (radiation irradiation side).

The scintillator 220 is formed by, for example, an evaporation method and has a columnar crystal structure (structure made of a plurality of columnar crystals). The scintillator 220 is typically made of an alkali halide, and can be made of, for example, CsI:Tl, CsI:Na, CsBr:Tl, NaI:Tl, LiI:Eu, or KI:Tl. As one example, a CsI:Tl scintillator can be formed by, for example, evaporating CsI and TlI while heating them in a vacuum chamber. An underlayer advantageous for forming the scintillator 220 may be formed in advance on the evaporation surface of the base member 210.

It is only necessary to constitute the base member 210 so as to satisfactorily transmit radiation. The base member 210 may be made of a material having light reflectivity. In this case, light (scintillation light) traveling from the scintillator 220 can be reflected by the base member 210 toward the sensor panel 100. For example, a metal such as Mg, Al, Ti, Cr, Mn, Fe, Co, Ni, Cu, Zn, Li, Be, or Na is usable for the base member 210. In addition, a resin such as PEEK, nylon, aramid, PPS, CFRP, or GFRP may be used for the base member 210, or an amorphous material such as glass or amorphous carbon, or a crystal material such as Si, Ge, crystal carbon, quartz, or aluminum oxide may be used.

In this example, the protective film 230 is formed from a plurality of layers. For example, the protective film 230 is constituted by a first layer 231, a second layer 232, and a third layer 233.

The first layer 231 is substantially made of a fluorine-based resin, and forms a first portion that covers the side faces and tips of the columnar crystals of the scintillator 220. The third layer 233 is substantially made of a resin (to be referred to as a "non-fluorine-based resin" in this specification) that is not a fluorine-based resin, and forms a second portion serving as a surface portion on the side of the sensor panel 100. The second layer 232 is made of a material obtained by mixing a fluorine-based resin and a non-fluorine-based resin, and functions as an intermediate layer that improves the bonding force between the first layer 231 and the third layer 233.

Examples of the fluorine-based resin are polytetrafluoroethylene (PTFE), polychlorotrifluoroethylene (PCTFE), a tetrafluoroethylene-hexafluoropropylene copolymer (FEP), polyvinylidene fluoride (PVDF), a fluorinated methacrylic acid ester polymer, polyvinyl fluoride (PVF), an ethylene-tetrafluoroethylene copolymer (ETFE), and an ethylene-chlorotrifluoroethylene copolymer (ECTFE).

Examples of the non-fluorine-based resin are polyvinylidene chloride (PVDC), a vinylidene chloride-vinyl chloride copolymer, a vinylidene chloride-acrylonitrile copolymer, polyvinyl chloride, an epoxy-based resin, an acrylic-based resin, a silicone-based resin, a urethane-based resin, a polyimide-based resin, cellulose acetate, cellulose nitrate, polymethyl methacrylate, polyvinyl butyral, polycarbonate, polyethylene terephthalate, polyethylene, nylon, a polyamide-based resin, a polyester-based resin, a styrene-butadiene rubber-based resin, and polyparaxylylene.

The fluorine-based resin has a water-repellent function (typically, the contact angle with respect to a water drop is larger than 90°), and is advantageous for suppressing the deliquescence of the scintillator 220, compared to the non-fluorine-based resin (typically, the contact angle with respect to a water drop is equal to or smaller than 90°). In contrast, the adhesion of the non-fluorine-based resin is higher than that of the fluorine-based resin, which is advantageous for bonding to a predetermined base member via an adhesive.

According to the arrangement in FIGS. 1A and 1B, the first layer 231 made of the fluorine-based resin is formed to cover the scintillator 220, and suppresses the deliquescence of the scintillator 220. The first layer 231 covers the side faces and tips of the columnar crystals of the scintillator 220, and is arranged so that the fluorine-based resin fills gaps between the columnar crystals of the scintillator 220. Thus, the adhesion between the first layer 231 and the scintillator 220 is improved by a so-called anchor effect.

To the contrary, the third layer 233 made of the non-fluorine-based resin has relatively high adhesion and is advantageous for bonding to the sensor panel 100. The sensor panel 100 and the scintillator panel 200 are fixed via a bonding member 300 to prevent peeling between the sensor panel 100 and the scintillator panel 200 owing to a shock in a subsequent manufacturing step, a shock at the time of using the apparatus 1, or the like.

Note that, for example, a pressure sensitive adhesive sheet may be used for the bonding member 300. Alternatively, a hot-melt resin, an epoxy-based resin, an acrylic-based resin, a silicone-based resin, a urethane-based resin, a polyimide-based resin, a polyester-based resin, a polyolefin-based resin, or the like may be used.

This arrangement can improve the adhesion of the protective film 230 while suppressing the deliquescence of the scintillator 220.

A method for manufacturing the apparatus 1 (mainly a method for forming the scintillator panel 200) will be described with reference to FIGS. 2A to 2D.

Figure 2A:
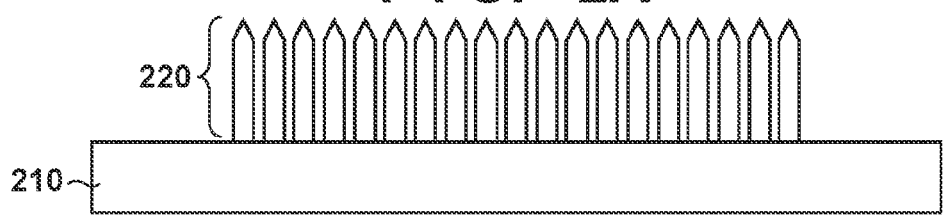
FIGS. 2A to 2D are views for explaining an example of a method for manufacturing a scintillator panel.

First, as exemplified in FIG. 2A, a scintillator 220 having a columnar crystal structure is formed on a base member 210 by, for example, an evaporation method. In this example, a CsI:Tl scintillator 220 was formed. A base member 210 (1 mm thick) made of amorphous carbon was set on a holder in the chamber of an evaporation apparatus, and evaporation was performed while adjusting the degree of vacuum to 0.1 Pa under the argon (Ar) gas condition. As a result, the scintillator 220 (600 μm thick) was formed over the base member 210.

Prior to the above-described step, an underlayer advantageous for forming the scintillator 220 may be formed on the evaporation surface of the base member 210. For example, an organic resin is typically used for the underlayer, and an epoxy resin, an acrylic resin, a polyimide resin, a silicone resin, a polyamide resin, or the like can be used.

Figure 2B:
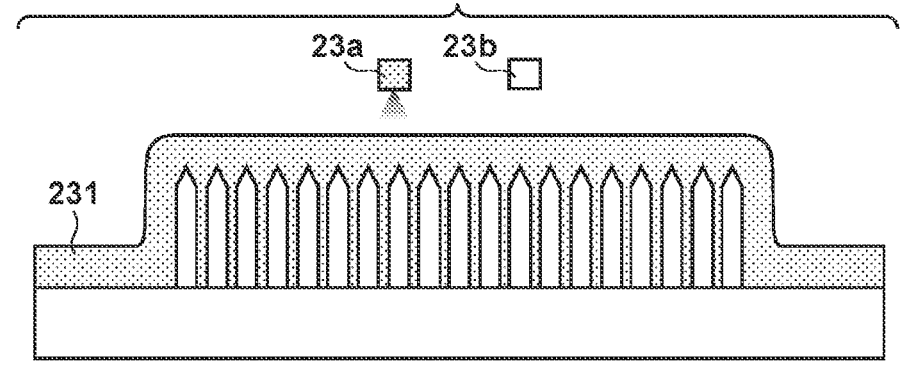

Then, as exemplified in FIG. 2B, a fluorine-based resin is applied from a spray 23a onto the base member 210 so as to cover the scintillator 220, forming a first layer 231. In this example, Novec 2702, available from 3M, containing a fluorinated methacrylic acid ester polymer was used as the fluorine-based resin.

Figure 2C:
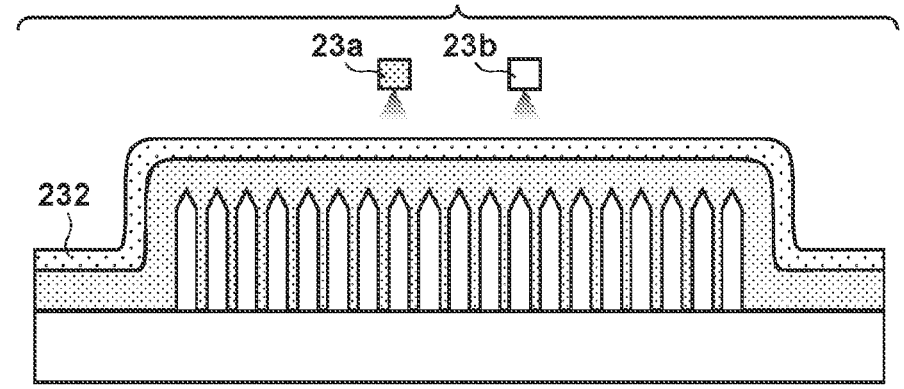

After that, as exemplified in FIG. 2C, while the fluorine-based resin is applied from the spray 23a, a non-fluorine-based resin is applied from a spray 23b onto the first layer 231, forming a second layer 232. That is, the second layer 232 is made of a material obtained by mixing the fluorine-based resin and the non-fluorine-based resin. In this example, ELEP COAT LSS-520MH (styrene-butadiene rubber-based resin) available from Nitto Shinko was used as the non-fluorine-based resin.

Figure 2D:
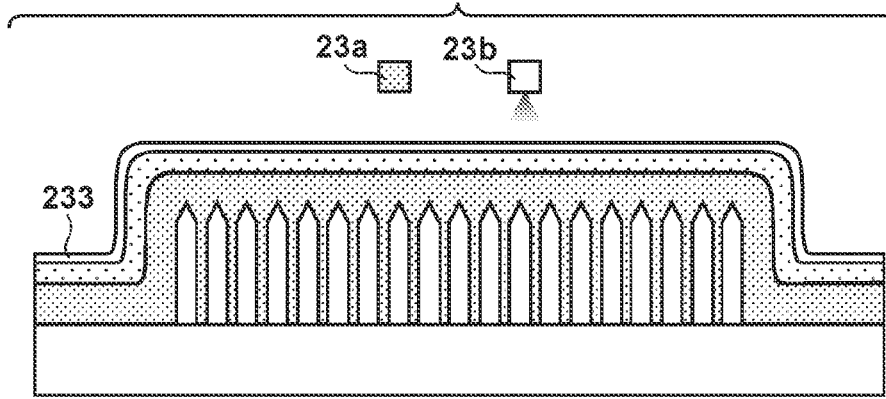

Finally, as exemplified in FIG. 2D, the non-fluorine-based resin is applied from the spray 23b onto the second layer 232, forming a third layer 233. In this manner, the scintillator panel 200 is obtained.

In this example, the total thickness of the protective film 230 was 15 μm by forming the first layer 231 at a film thickness of 2 μm, the second layer 232 at a film thickness of 8 μm, and the third layer 233 at a film thickness of 5 μm. The second layer 232 is made of a material obtained by mixing a fluorine-based resin and a non-fluorine-based resin, and functions as an intermediate layer that improves the bonding force between the first layer 231 and the third layer 233. That is, the content of fluorine (ratio of the fluorine-based resin to the non-fluorine-based resin in this example) in the protective film 230 decreases from the side of the first layer 231 (side of the scintillator 220) to the side of the third layer 233 (side of the sensor panel 100). Note that the mixture ratio of the fluorine-based resin and non-fluorine-based resin in the second layer 232 may be 1:1, but is not limited to this value (this ratio).

Separately from the above-described steps, the sensor panel 100 is prepared. The sensor panel 100 suffices to be fabricated using a well-known manufacturing process, and a description thereof will be omitted here. In this example, the sensor panel 100 was fabricated by forming each element using amorphous silicon on a glass substrate (0.7 mm thick).

After that, the scintillator panel 200 was adhered and fixed to the sensor panel 100 by using the bonding member 300 so that the sensor array 120 and the scintillator 220 overlap each other when viewed from the top. In this example, P-0280 (acrylic-based adhesive, 25 μm thick) available from Lintec was used as the bonding member 300.

The apparatus 1 manufactured in this way can suppress the deliquescence of the scintillator 220 by the protective film 230, and improve the adhesion between the sensor panel 100 and the scintillator panel 200. The structure and manufacturing method of the apparatus 1 are not limited to this embodiment, and may be properly changed without departing from the scope of the present invention.

For example, it is only necessary to prevent peeling between the sensor panel 100 and the scintillator panel 200, so the third layer 233 made of the non-fluorine-based resin suffices to be arranged in a region close to at least the sensor panel 100, as exemplified in FIG. 3A.

As exemplified in FIG. 3B, the end portions of the sensor panel 100 and scintillator panel 200 may be sealed by a resin 400. The resin 400 is made of, for example, a shock-resistant material (for example, a material with a relatively high elastic modulus). Examples of the resin 400 are an epoxy-based resin, an acrylic-based resin, a silicone-based resin, a urethane-based resin, a polyimide-based resin, a polyamide-based resin, a polyester-based resin, polyparaxylylene, polytetrafluoroethylene, polytrifluoroethylene chloride, a tetrafluoroethylene-hexafluoropropylene copolymer, polyvinylidene chloride, a vinylidene chloride-vinyl chloride copolymer, a vinylidene chloride-acrylonitrile copolymer, polyvinyl chloride, polyethylene terephthalate, a styrene-butadiene rubber-based resin, and a polyolefin-based resin.

Second Embodiment

The second embodiment will be explained with reference to FIG. 4. The above-described first embodiment has exemplified a structure in which the protective film 230 is constituted by three layers of the first layer 231 to third layer 233. However, the present invention is not limited to this structure, and the number of layers of the protective film 230 may be further increased.

As exemplified in FIG. 4, a protective film 240 according to the second embodiment is constituted by a first layer 241 to fifth layer 245. The first layer 241 corresponds to the first layer 231 in the first embodiment (see FIG. 1), forms a first portion that covers (the side face and tip of) a scintillator 220, and can be substantially made of a fluorine-based resin advantageous for suppressing the deliquescence of the scintillator 220. The fifth layer 245 corresponds to the third layer 233 in the first embodiment, forms a second portion serving as a surface portion on the side of a sensor panel 100, and can be substantially made of a non-fluorine-based resin having relatively high adhesion. The second layer 242 to fourth layer 244 correspond to the second layer 232, function as an intermediate layer that increases the bonding force between the first layer 241 and the fifth layer 245, and are constituted so that the mixture ratio of the fluorine-based resin and non-fluorine-based resin gradually changes from the side of the second layer 242 to the side of the fourth layer 244. That is, the content of fluorine (ratio of the fluorine-based resin to the non-fluorine-based resin in this example) in the protective film 240 decreases from the side of the first layer 241 (side of the scintillator 220) to the side of the fifth layer 245 (side of the sensor panel 100).

In this example, the protective film 240 (15 μm thick) was formed using Novec 2702 available from 3M (as in the first embodiment) as the fluorine-based resin, and using a polyvinylidene chloride solution dissolved by tetrahydrofuran as the non-fluorine-based resin. As for the first layer 241, the mixture ratio of the fluorine-based resin and non-fluorine-based resin was 10:0 (the first layer 241 was substantially made of the fluorine-based resin). As for the second layer 242, the mixture ratio of the fluorine-based resin and non-fluorine-based resin was 8:2. As for the third layer 243, the mixture ratio of the fluorine-based resin and non-fluorine-based resin was 5:5. As for the fourth layer 244, the mixture ratio of the fluorine-based resin and non-fluorine-based resin was 2:8. As for the fifth layer 245, the mixture ratio of the fluorine-based resin and non-fluorine-based resin was 0:10 (the fifth layer 245 was substantially made of the non-fluorine-based resin).

Thereafter, as in the first embodiment, the scintillator panel 200 suffices to be adhered and fixed to the sensor panel 100 by using a bonding member 300. In this example, PD-S1 (acrylic-based adhesive, 25 μm thick) available from PANAC was used as the bonding member 300. Also, a CMOS image sensor formed on a silicon substrate using a semiconductor manufacturing process was used as the sensor panel 100.

According to the second embodiment, while resin application amounts by sprays 23a and 23b are adjusted, the first layer 241 to fifth layer 245 constituting the protective film 240 are formed. The first layer 241 to fifth layer 245 are constituted so that the mixture ratio of constituent materials changes gradually. For this reason, the bonding force between the first layer 241 and the fifth layer 245 (between the layers) can be further increased, which is advantageous for preventing peeling between the first layer 241 and the fifth layer 245. The second embodiment can therefore obtain the same effects as those of the first embodiment, and is further advantageous for preventing peeling between the first layer 241 and fifth layer 245 constituting the protective film 240. Note that this example has exemplified a structure in which the protective film 240 is constituted by five layers, but the number of layers may be further increased. Alternatively, the protective film 240 may be constituted by one layer so that the mixture ratio of constituent materials in the layer changes gradually from the side of the scintillator 220 to the side of the sensor panel 100.

Third Embodiment

The third embodiment will be described with reference to FIGS. 5A to 5C. In the third embodiment, first, a film 251 substantially made of a fluorine-based resin is formed to cover the surfaces (side faces and tips) of the columnar crystals of a scintillator 220 and not to fill gaps between the columnar crystals. Then, a member 252 substantially made of a non-fluorine-based resin is formed to fill the gaps between the columnar crystals covered with the film 251.

More specifically, first, as exemplified in FIG. 5A, a scintillator 220 having a columnar crystal structure is formed over a base member 210, as in the first embodiment. Then, as exemplified in FIG. 5B, a fluorine-based resin is applied from a spray 23a, forming a film 251 (1 μm thick) so as to cover the surfaces (side faces and tips) of the columnar crystals of the scintillator 220 and not to fill gaps between the columnar crystals. In this example, Novec 2702 available from 3M (as in the first embodiment) is used as the fluorine-based resin.

Finally, as exemplified in FIG. 5C, a non-fluorine-based resin is applied from a spray 23b onto the film 251, forming a member 252 so as to fill the gaps between the columnar crystals covered with the film 251. In this example, a polyvinylidene chloride solution dissolved by cyclohexanone as the non-fluorine-based resin was used. In this fashion, a protective film 250 (15 µm thick) was formed.

According to the third embodiment, the member 252 is formed to fill gaps between columnar crystals. Thus, even if an intermediate layer made of a material obtained by mixing a fluorine-based resin and a non-fluorine-based resin does not exist between the film 251 and the member 252, the adhesion between the film 251 and the member 252 is improved by the anchor effect. The third embodiment can obtain the same effects as those of the first embodiment, and is further advantageous for preventing peeling between the film 251 and the member 252. Needless to say, the intermediate layer may be formed between the film 251 and the member 252.

(Others)

Several preferred embodiments have been described above, but the present invention is not limited to them. The embodiments may be partially changed, the features of the embodiments may be combined, or the features of the embodiments may be combined with another known structure or form without departing from the scope or spirit of the invention.

Figure 6:
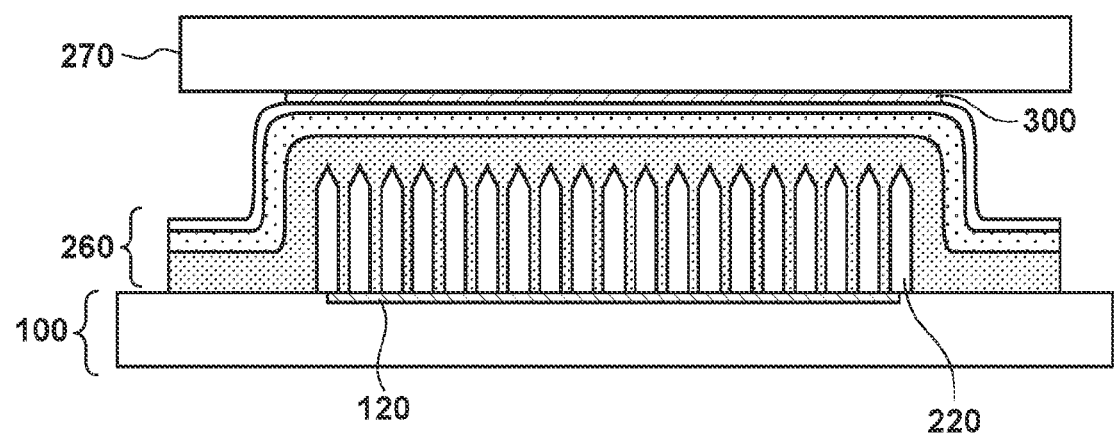
FIG. 6 is a view for explaining an example of the structure of a radiation imaging apparatus.

For example, the first embodiment has exemplified a form in which the apparatus 1 is manufactured by adhering the sensor panel 100 and the scintillator panel 200. However, the present invention is not limited to this form. For example, as exemplified in FIG. 6, the sensor panel 100 may be prepared as in this example, and the scintillator 220 may be formed over a surface of the sensor panel 100 on the side of the sensor array 120. Even in this case, a protective film 260 that covers the scintillator 220 is formed by the same method as in the example of each embodiment. After that, a predetermined base member 270 (for example, a plate having light reflectivity) is arranged over the protective film 260 via, for example, the bonding member 300.

(Example of Application to Radiation Imaging System)

Figure 7:
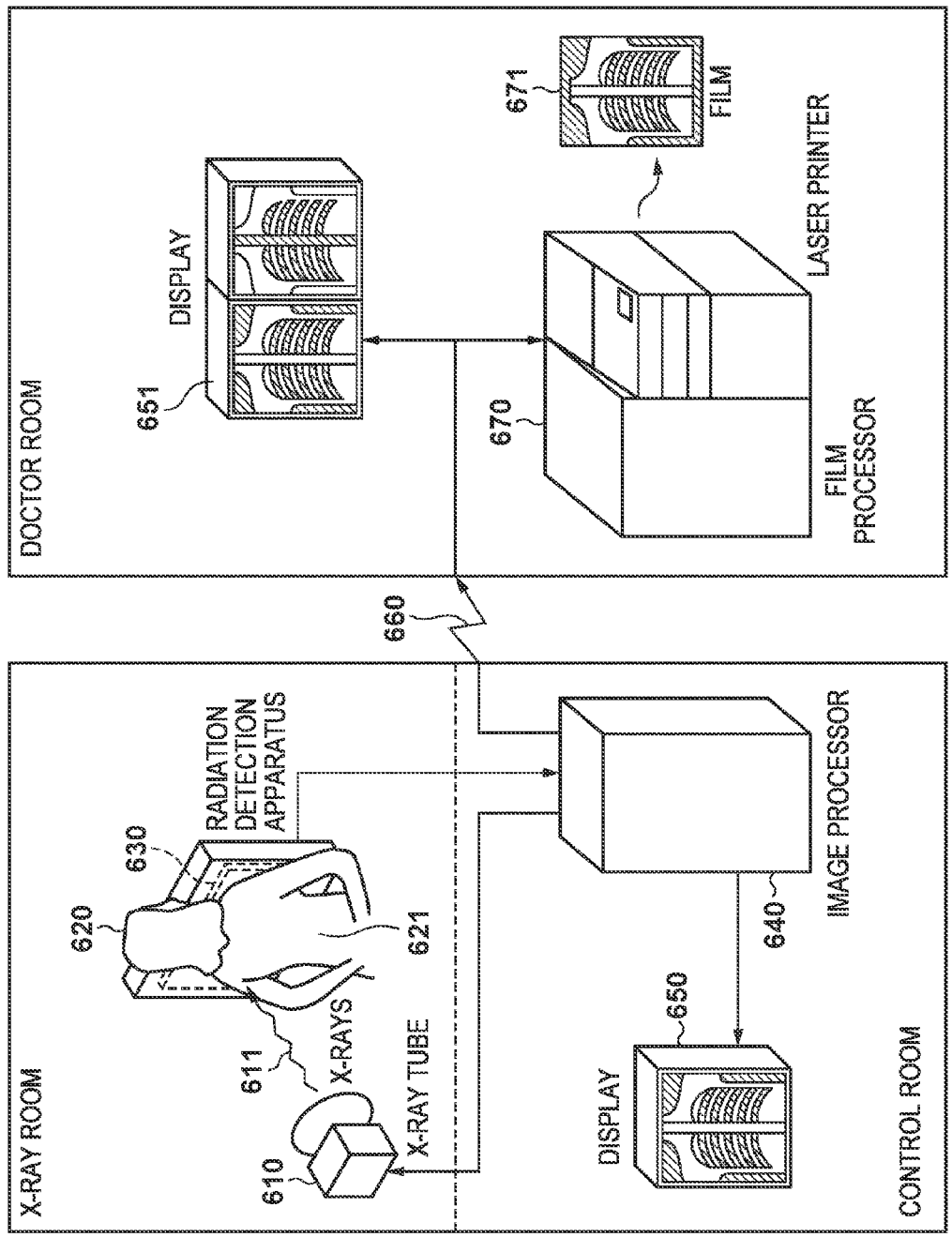
FIG. 7 is a view for explaining an example of the system configuration of a radiation inspection apparatus.

As exemplified in FIG. 7, the radiation imaging apparatus described in each of the above embodiments is applicable to an imaging system typified by a radiation inspection apparatus or the like. The radiation includes an X-ray, α-ray, β-ray, and γ-ray. Here, a case in which an X-ray is used will be explained as a typical example.

X-rays 611 generated by an X-ray tube 610 (radiation source) pass through a chest 621 of a patient 620 and enter a radiation imaging apparatus 630. The incident X-rays 611 include information about the inside of the body of the patient 620, and the apparatus 630 obtains electrical information corresponding to the X-rays 611. The electrical information is converted into a digital signal, and undergoes predetermined signal processing by, for example, an image processor 640 (signal processing unit). A user such as a doctor can observe a radiation image corresponding to the electrical information on, for example, a display 650 (display unit) in a control room. The user can transfer the radiation image or the data to a remote place by a predetermined communication means 660, and the radiation image can be observed on a display 651 at another place such as a doctor room. The user can also record the radiation image or the data on a predetermined recording medium. For example, the radiation image or the data can be recorded on a film 671 by a film processor 670.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-003610, filed Jan. 9, 2015, which is hereby incorporated by reference herein in its entirety.

What is claimed is:

1. A radiation imaging apparatus comprising:
a sensor panel on which a plurality of sensors are arrayed;
a scintillator that is arranged over a base member and is made of an alkali halide; and
a protective film configured to suppress deliquescence of the scintillator,
wherein the protective film includes
a first portion that covers a side face of the scintillator and an end of the scintillator on a side opposite to the base member, and
a second portion that is smaller in a content of fluorine than the first portion and covers at least part of a surface of the first portion.

2. The apparatus according to claim 1, wherein
the scintillator is made of a plurality of columnar crystals,
the first portion covers a side face and tip of each columnar crystal of the scintillator,
the protective film is made of a first resin serving as a fluorine-based resin and a second resin not serving as a fluorine-based resin, and
a ratio of the first resin to the second resin at the second portion is smaller than a ratio of the first resin to the second resin at the first portion.

3. The apparatus according to claim 2, wherein a film made of the first resin is formed to cover the side face and tip of each columnar crystal of the scintillator, and a member containing at least the second resin is formed to cover the scintillator while filling gaps between the columnar crystals covered with the first resin.

4. The apparatus according to claim 2, wherein the first resin contains at least one material selected from the group consisting of polytetrafluoroethylene, polychlorotrifluoroethylene, a tetrafluoroethylene-hexafluoropropylene copolymer, polyvinylidene fluoride, a fluorinated methacrylic acid ester polymer, polyvinyl fluoride, an ethylene-tetrafluoroethylene copolymer, and an ethylene-chlorotrifluoroethylene copolymer.

5. The apparatus according to claim 2, wherein the second resin contains at least one material selected from the group consisting of polyvinylidene chloride, a vinylidene chloride-vinyl chloride copolymer, a vinylidene chloride-acrylonitrile copolymer, polyvinyl chloride, an epoxy-based resin, an acrylic-based resin, a silicone-based resin, a urethane-based resin, a polyimide-based resin, cellulose acetate, cellulose nitrate, polymethyl methacrylate, polyvinyl butyral, polycarbonate, polyethylene terephthalate, polyethylene, nylon, a polyamide-based resin, a polyester-based resin, a styrene-butadiene rubber-based resin, and polyparaxylylene.

6. The apparatus according to claim 2, wherein
a contact angle of the first resin and a water drop is larger than 90°, and
a contact angle of the second resin and a water drop is not larger than 90°.

7. The apparatus according to claim 1, wherein the sensor panel and the protective film are fixed via a bonding member.

8. A radiation imaging apparatus comprising:
a sensor panel on which a plurality of sensors are arrayed;
a scintillator that is arranged over the sensor panel and is made of an alkali halide; and
a protective film configured to suppress deliquescence of the scintillator,
wherein the protective film includes
a first portion that covers a side face of the scintillator and an end of the scintillator on a side opposite to the sensor panel, and
a second portion that is smaller in a content of fluorine than the first portion and covers at least part of a surface of the first portion.

9. The apparatus according to claim 8, further comprising a base member arranged over the scintillator,
wherein the scintillator is made of a plurality of columnar crystals,
the first portion covers a side face and tip of each columnar crystal of the scintillator, and
the base member is made of a material with light reflectivity.

10. The apparatus according to claim 8, wherein the base member and the protective film are fixed via a bonding member.

11. A radiation inspection apparatus comprising:
a radiation imaging apparatus; and
a processor configured to process a signal from the radiation imaging apparatus,
the radiation imaging apparatus including:
a sensor panel on which a plurality of sensors are arrayed;
a scintillator that is arranged over a base member and is made of an alkali halide; and
a protective film configured to suppress deliquescence of the scintillator,
wherein the protective film includes
a first portion that covers a side face of the scintillator and an end of the scintillator on a side opposite to the base member, and
a second portion that is smaller in a content of fluorine than the first portion and covers at least part of a surface of the first portion.

12. A radiation inspection apparatus comprising:
a radiation imaging apparatus; and
a processor configured to process a signal from the radiation imaging apparatus,
the radiation imaging apparatus including:
a sensor panel on which a plurality of sensors are arrayed;
a scintillator that is arranged over the sensor panel and is made of an alkali halide; and
a protective film configured to suppress deliquescence of the scintillator,
wherein the protective film includes
a first portion that covers a side face of the scintillator and an end of the scintillator on a side opposite to the sensor panel, and
a second portion that is smaller in a content of fluorine than the first portion and covers at least part of a surface of the first portion.

13. A method for manufacturing a radiation imaging apparatus, comprising:
preparing a sensor panel on which a plurality of sensors are arrayed;
preparing a base member and forming, over the base member, a scintillator made of an alkali halide;
forming, over the scintillator, a protective film configured to suppress deliquescence of the scintillator; and
fixing, to the sensor panel, the base member on which the scintillator is formed, so as to bring the scintillator close to the plurality of sensors of the sensor panel,
wherein the forming the protective film includes
forming a first portion that covers a side face of the scintillator and an end of the scintillator on a side opposite to the base member, the first portion being part of the protective film, and
forming a second portion that is smaller in a content of fluorine than the first portion and covers at least part of a surface of the first portion, the second portion being part of the protective film.

14. A method for manufacturing a radiation imaging apparatus, comprising:
preparing a sensor panel on which a plurality of sensors are arrayed;
forming, over the sensor panel, a scintillator made of an alkali halide;
forming, over the scintillator, a protective film configured to suppress deliquescence of the scintillator; and
preparing a base member and fixing the base member to the sensor panel on which the scintillator is formed, so as to bring the base member close to the scintillator,
wherein the forming the protective film includes
forming a first portion that covers a side face of the scintillator and an end of the scintillator on a side opposite to the sensor panel, the first portion being part of the protective film, and
forming a second portion that is smaller in a content of fluorine than the first portion and covers at least part of a surface of the first portion, the second portion being part of the protective film.

* * * * *